US012258871B1

(12) United States Patent
Winn et al.

(10) Patent No.: US 12,258,871 B1
(45) Date of Patent: Mar. 25, 2025

(54) DYNAMIC LIVE HINGE SPRING OPTIMIZED IMPELLER

(71) Applicant: Hamilton Sundstrand Corporation, Charlotte, NC (US)

(72) Inventors: Alden Winn, Glastonbury, CT (US); Andrew Solomon, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/649,391

(22) Filed: Apr. 29, 2024

(51) Int. Cl.

| | |
|---|---|
| ***F01D 17/14*** | (2006.01) |
| ***F01D 5/22*** | (2006.01) |
| ***F01D 5/28*** | (2006.01) |

(52) U.S. Cl.
CPC ........... *F01D 17/141* (2013.01); *F01D 5/225* (2013.01); *F01D 5/28* (2013.01); *F05D 2240/12* (2013.01); *F05D 2240/30* (2013.01); *F05D 2300/17* (2013.01)

(58) Field of Classification Search
CPC ...... F01D 17/141; F01D 17/14; F01D 17/146; F01D 17/148; F01D 17/16; F04D 25/14; F04D 27/0253; F05D 2250/51; F05D 2250/511; F05D 2250/512; F05D 2270/10; F05D 2270/101
See application file for complete search history.

(56) References Cited

U.S. PATENT DOCUMENTS

| | | | | |
|---|---|---|---|---|
| 7,025,086 | B2 * | 4/2006 | Maeda | F16K 15/035 137/512.1 |
| 9,989,068 | B2 | 6/2018 | Houst et al. | |
| 10,859,097 | B2 | 12/2020 | Mohtar et al. | |
| 10,876,467 | B2 | 12/2020 | Mohtar et al. | |
| 2016/0230650 | A1 * | 8/2016 | Mohtar | F02B 37/24 |
| 2019/0257315 | A1 * | 8/2019 | Terraz | F24F 13/142 |

FOREIGN PATENT DOCUMENTS

| | | | |
|---|---|---|---|
| DE | 102010026176 | A1 | 1/2012 |

* cited by examiner

*Primary Examiner* — Brian O Peters
(74) *Attorney, Agent, or Firm* — Kinney & Lange, P.A.

(57) ABSTRACT

An impeller includes a cylindrical portion defining a fluid inlet, the cylindrical portion coaxial with a rotational axis of the impeller, a hub, a shroud extending downward and radially away from the cylindrical portion and covering the hub, a plurality of vanes extending between the shroud and the hub, a fluid outlet downstream of the plurality of vanes, a plurality of doors disposed circumferentially about the cylindrical portion proximate the inlet, and a spring element attached to and disposed between each of the plurality of doors and the cylindrical portion. Each of the plurality of doors is actuatable, via the spring element, between a first state and a second state.

20 Claims, 3 Drawing Sheets

DYNAMIC LIVE HINGE SPRING OPTIMIZED IMPELLER

BACKGROUND

This application relates to an impeller and, more particularly, to a two-stage impeller.

Impellers are traditionally fixed-sized metal components and thus, are not very adaptable to varied flow rates. Instead, traditional impellers are designed and evaluated for stability over both low and high flow regimes. As such, these impellers are often more well adapted to one or the other of low and high flow regimes, and significantly less adapted to the other. Accordingly, more adaptable impeller designs are desirable.

SUMMARY

An impeller includes a cylindrical portion defining a fluid inlet, the cylindrical portion coaxial with a rotational axis of the impeller, a hub, a shroud extending downward and radially away from the cylindrical portion and covering the hub, a plurality of vanes extending between the shroud and the hub, a fluid outlet downstream of the plurality of vanes, a plurality of doors disposed circumferentially about the cylindrical portion proximate the inlet, and a spring element attached to and disposed between each of the plurality of doors and the cylindrical portion. Each of the plurality of doors is actuatable, via the spring element, between a first state and a second state.

A method of operating an impeller includes introducing a fluid flow to an inlet of the impeller, rotating the impeller about an axis to accelerate a fluid flow across a plurality of vanes disposed between a shroud and a hub of the impeller and through a fluid outlet, and varying an area of the fluid inlet by varying a speed and pressure of the fluid flow on a plurality of doors disposed at the fluid inlet to such that the plurality of doors are actuated between a first state and a second state.

Figure 1:
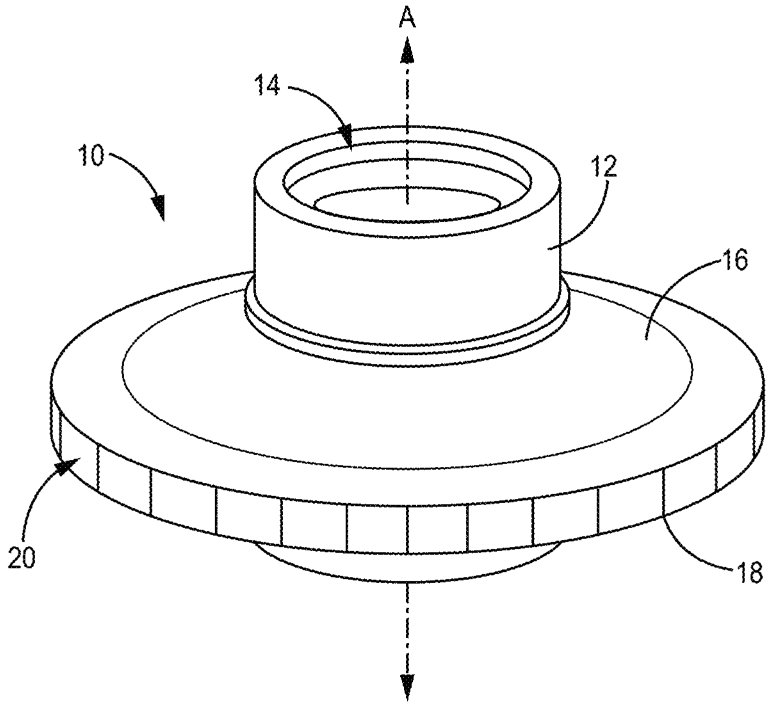
FIG. 1 is a simplified perspective view of an impeller.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents an impeller with a dynamic inlet for directing flow to different vanes depending on low or high flow rates. More specifically, the impeller can be fabricated with hinged doors near the inlet to vary the flow through the inlet. This allows the impeller to operate efficiently at all flow regimes.

Figure 2:
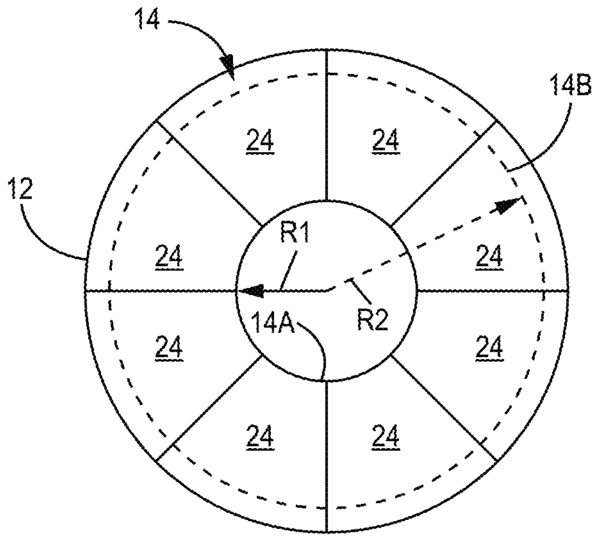
FIG. 2 is a simplified top view of the impeller of FIG. 1.
Figure 3:
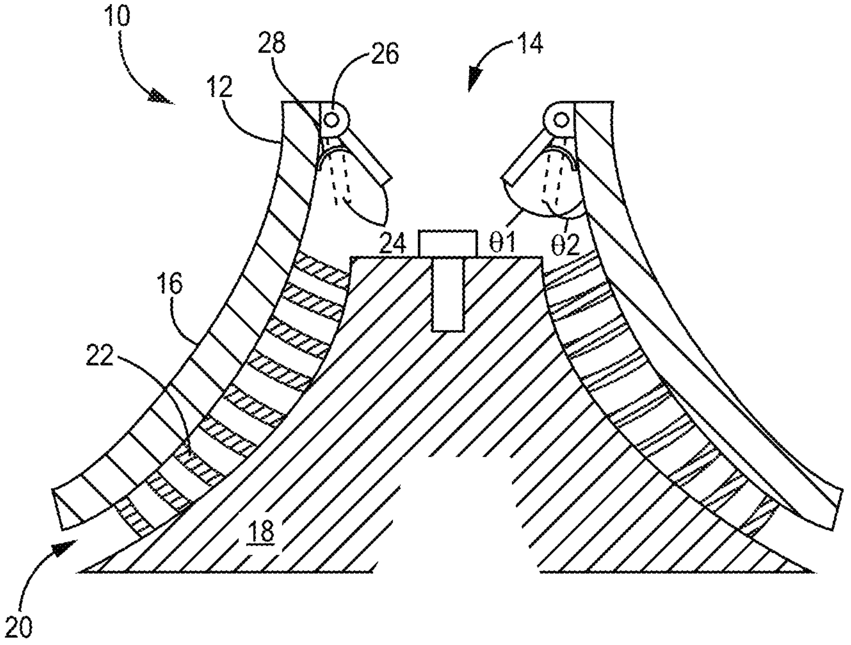
FIG. 3 is a simplified cross-sectional view of the impeller of FIGS. 1 and 2.

FIG. 1 is a simplified perspective view of impeller 10. FIG. 2 is a simplified top view of impeller 10. FIG. 3 is a simplified cross-sectional view of impeller 10. FIGS. 1, 2, and 3 are discussed together.

Impeller 10 includes cylindrical portion 12 defining fluid inlet 14, shroud 16, hub 18, and fluid outlet 20 disposed circumferentially in a space between shroud 16 and hub 18. Vanes 22 (FIG. 3) are also disposed between shroud 16 and hub 18. In operation of impeller 10, fluid enters into impeller 10 via inlet 14. Fluid can be a liquid such as oil or liquid fuel in an exemplary embodiment, and a gas in an alternative embodiment. Rotation of impeller 10 about axis A directs fluid flow radially outward from inlet 14 to outlet 20, accelerating the flow across vanes 22.

Unlike many existing impellers, impeller 10 has a variable area inlet 14 achieved using actuatable doors 24 circumferentially disposed about cylindrical portion 12 proximate inlet 14. FIG. 2 specifically illustrates doors 24 in a first state, associated with relatively low flow rates through impeller 10 in which doors 24 define inlet 14A having radius R1. Doors 24 are actuatable between the first state and a second state, associated with relatively high flow rates into impeller 10 in which doors 24 are essentially pushed downward (i.e., in the downstream direction) to define inlet 14B (indicated by dashed lines) having a larger radius R2. As such, inlet 14A can have a first area defined, in part, by R1 (i.e., $A=\pi \cdot R1^2$) and inlet 14B can have a second area similarly defined by R2. Doors 24 can further overlap with the immediately adjacent doors 24. The shape and number of doors 24 can be varied depending on such factors as impeller type and size, as well as desired sizes of inlets 14A and 14B. An infinite number of intermediate states can exist between the first state and the second state.

FIG. 3 shows further details of doors 24, which are connected to cylindrical portion 12 of impeller 10 by hinge 26 which allow each door 24 to pivot/swing between the first and second states. Spring element 28 attached to each door 24 actuates a respective door 24 between the first state and the second state (indicated by dashed lines), and/or to any of the states therebetween. In the embodiment shown, spring elements 28 are arcuate, or "C" shaped elements, although other types of springs are contemplated herein. In the first state, angle θ1 formed between a respective door 24 and cylindrical (i.e., axially-oriented) portion 12 is greater than angle θ2 between the respective door 24 and cylindrical portion 12 in the second state. Impeller 10 can be formed as a monolithic component, via additive manufacturing, from a metallic material, such as aluminum, stainless steel, or nickel alloy. Fabrication can more specifically include a captured metal printing process to form any of doors 24, hinge 26, and/or spring elements 28. A single metallic material throughout is preferable to prevent issues with material mismatch. Using additive manufacturing, spring elements 28 can be formed into the inner surface of cylindrical portion 12 as well as into a respective door 24. Hinge 26 can further be formed as a single annular structure or discrete segments, depending on the embodiment.

As discussed above, in relatively low flow states of impeller 10, fluid flow into inlet 14 can impose no or a minimal downward force on doors 24 and thereby, spring elements 28 resulting in the relatively smaller inlet 14A. In such an operational state, fluid flow into impeller 10 impinges most directly on the region of vanes 22 proximate hub 18, which is aerodynamically optimized for low flow regimes. As impeller speed and fluid intake increases, the downward force upon doors 24 and spring elements 28 increases and doors 24 move toward the inner surface of cylindrical portion 12. As doors 24 transition to the second state, the incoming fluid flow is directed primarily towards the region of vanes 22 proximate shroud 16, which is aerodynamically optimized for higher flow regimes. As such, actuatable doors 24 allow impeller 10 to operate efficiently at low and high flow regimes, as well as intermediate flow regimes. It should be noted that doors 24 need not all actuate in unison to the same degree, and further that doors 24 are mechanically actuatable based on fluid flow, and do not require electrical inputs.

The dimensions of inlets 14A and 14B, and the various intermediate inlet sizes can be controlled in part by the material selected for spring elements 28, the thickness of spring elements 28, and/or the dimensions of doors 24. Each of these variables is easily controlled using the additive manufacturing. In general, spring elements 28 can be designed to deform under the pressure caused by the incoming fluid flow close to, or up its yield point, or the point at which plastic deformation occurs. A suitable yield point can be selected based on the anticipated high flow regime characteristics of a given impeller 10.

Discussion of Possible Embodiments

The following are non-exclusive descriptions of possible embodiments of the present invention.

An impeller includes a cylindrical portion defining a fluid inlet, the cylindrical portion coaxial with a rotational axis of the impeller, a hub, a shroud extending downward and radially away from the cylindrical portion and covering the hub, a plurality of vanes extending between the shroud and the hub, a fluid outlet downstream of the plurality of vanes, a plurality of doors disposed circumferentially about the cylindrical portion proximate the inlet, and a spring element attached to and disposed between each of the plurality of doors and the cylindrical portion. Each of the plurality of doors is actuatable, via the spring element, between a first state and a second state.

The impeller of the preceding paragraph can optionally include, additionally and/or alternatively, any one or more of the following features, configurations and/or additional components:

In the above impeller, in the first state, the plurality of doors can define a first inlet area, and in the second state, the plurality of doors can define a second inlet area different than the first inlet area.

In any of the above impellers, the second inlet area can be greater than the first inlet area.

Any of the above impellers can further include a hinge interconnecting each of the plurality of doors to the cylindrical portion.

In any of the above impellers, the hinge can be a single annular structure interconnecting each of the plurality of doors to the cylindrical portion.

In any of the above impellers, the plurality of actuatable doors, the hinge, and the spring elements can be monolithically formed from a metallic material.

In any of the above impellers, the impeller can be monolithically formed from the metallic material.

In any of the above impellers, the metallic material can be one of aluminum, stainless steel, and a nickel alloy.

In any of the above impellers, in the first state, each of the plurality of doors can be angled away from the cylindrical portion a first angle, and in the second state, each of the plurality of doors can be angled away from the cylindrical portion a second angle.

In any of the above impellers, the first angle can be greater than the second angle.

In any of the above impellers, each spring element can have an arcuate shape.

In any of the above impellers, each of the plurality of vanes can further include a first region proximate the hub and aerodynamically optimized for a first flow regime of the fluid, and a second region proximate the shroud and aerodynamically optimized for a second, higher flow regime of the fluid.

A method of operating an impeller includes introducing a fluid flow to an inlet of the impeller, rotating the impeller about an axis to accelerate a fluid flow across a plurality of vanes disposed between a shroud and a hub of the impeller and through a fluid outlet, and varying an area of the fluid inlet by varying a speed and pressure of the fluid flow on a plurality of doors disposed at the fluid inlet to such that the plurality of doors are actuated between a first state and a second state.

The method of the preceding paragraph can optionally include, additionally and/or alternatively, any one or more of the following features, configurations and/or additional steps:

In the above method, at a relatively low speed and pressure of the fluid flow, the plurality of doors can be in the first state defining a first inlet area.

Any of the above methods can further include increasing the speed and pressure of the fluid flow to actuate the plurality of doors to a second state defining a second inlet area, the second inlet area being greater than the first inlet area.

In any of the above methods, actuating the plurality of doors to the second state can include deforming a spring element connected to each of the plurality of doors.

In any of the above methods, actuating the plurality of doors to the second state can further include pivoting the plurality of doors about a hinge.

In any of the above methods, in the first state, the fluid flow can impinge upon a region of at least a subset of the plurality of vanes proximate the hub.

In any of the above methods, in the second state, the fluid flow can impinge upon a region of at least a subset of the plurality of vanes proximate the shroud.

In any of the above methods, the fluid can be a liquid.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An impeller comprising:
- a hub;
- a shroud comprising:
  - a cylindrical portion defining a fluid inlet, the cylindrical portion coaxial with a rotational axis of the impeller;
  - the shroud extending radially outward and downstream from the cylindrical portion and covering the hub;
- a plurality of vanes connected to and extending between the shroud and the hub;

a fluid outlet downstream of the plurality of vanes, such that a fluid flow direction through the impeller is defined from the fluid inlet, past the plurality of vanes, to the fluid outlet;

a plurality of doors disposed circumferentially about the cylindrical portion proximate the inlet; and a spring element attached to and disposed between each of the plurality of doors and the cylindrical portion, wherein each of the plurality of doors is actuatable, via the spring element, between a first state and a second state.

2. The impeller of claim 1 wherein in the first state, the plurality of doors defines a first inlet area, and wherein in the second state, the plurality of doors defines a second inlet area different than the first inlet area.

3. The impeller of claim 2, wherein the second inlet area is greater than the first inlet area.

4. The impeller of claim 2 and further comprising: a hinge interconnecting each of the plurality of doors to the cylindrical portion.

5. The impeller of claim 4, wherein the hinge is a single annular structure interconnecting each of the plurality of doors to the cylindrical portion.

6. The impeller of claim 4, wherein the plurality of actuatable doors, the hinge, and the spring elements are formed from a metallic material.

7. The impeller of claim 6, wherein the impeller is formed from the metallic material.

8. The impeller of claim 7, wherein the metallic material is one of aluminum, stainless steel, and a nickel alloy.

9. The impeller of claim 2, wherein:

in the first state, each of the plurality of doors s angled away from the cylindrical portion a first angle; and in the second state, each of the plurality of doors is angled away from the cylindrical portion a second angle.

10. The impeller of claim 9, wherein the first angle is greater than the second angle.

11. The impeller of claim 2, wherein each spring element has an arcuate shape.

12. The impeller of claim 2, wherein each of the plurality of vanes comprises:

a first region proximate the hub and aerodynamically optimized for a first flow regime of the fluid; and a second region proximate the shroud and aerodynamically optimized for a second, higher flow regime of the fluid.

13. A method of operating the impeller of claim 1, the method comprising:

introducing a fluid flow to the fluid inlet;

rotating the impeller about the rotational axis to accelerate a fluid flow across the plurality of vanes and through the fluid outlet; and varying an area of the fluid inlet by varying a speed and pressure of the fluid flow on the plurality of doors such that the plurality of doors s actuated between the first state and the second state.

14. The method of claim 13, wherein at a first speed and pressure of the fluid flow, the plurality of doors is in the first state defining a first inlet area.

15. The method of claim 14 and further comprising: increasing the speed and pressure of the fluid flow to actuate the plurality of doors to the second state defining a second inlet area, the second inlet area being greater than the first inlet area.

16. The method of claim 15, wherein actuating the plurality of doors to the second state comprises deforming a spring element connected to each of the plurality of doors.

17. The method of claim 14, wherein actuating the plurality of doors to the second state further comprises pivoting the plurality of doors about a hinge.

18. The method of claim 15, wherein in the first state, the fluid flow impinges upon a region of at least a subset of the plurality of vanes proximate the hub.

19. The method of claim 18, wherein in the second state, the fluid flow impinges upon a region of at least a subset of the plurality of vanes proximate the shroud.

20. The method of claim 19, wherein the fluid is a liquid.

* * * * *